UNITED STATES PATENT OFFICE.

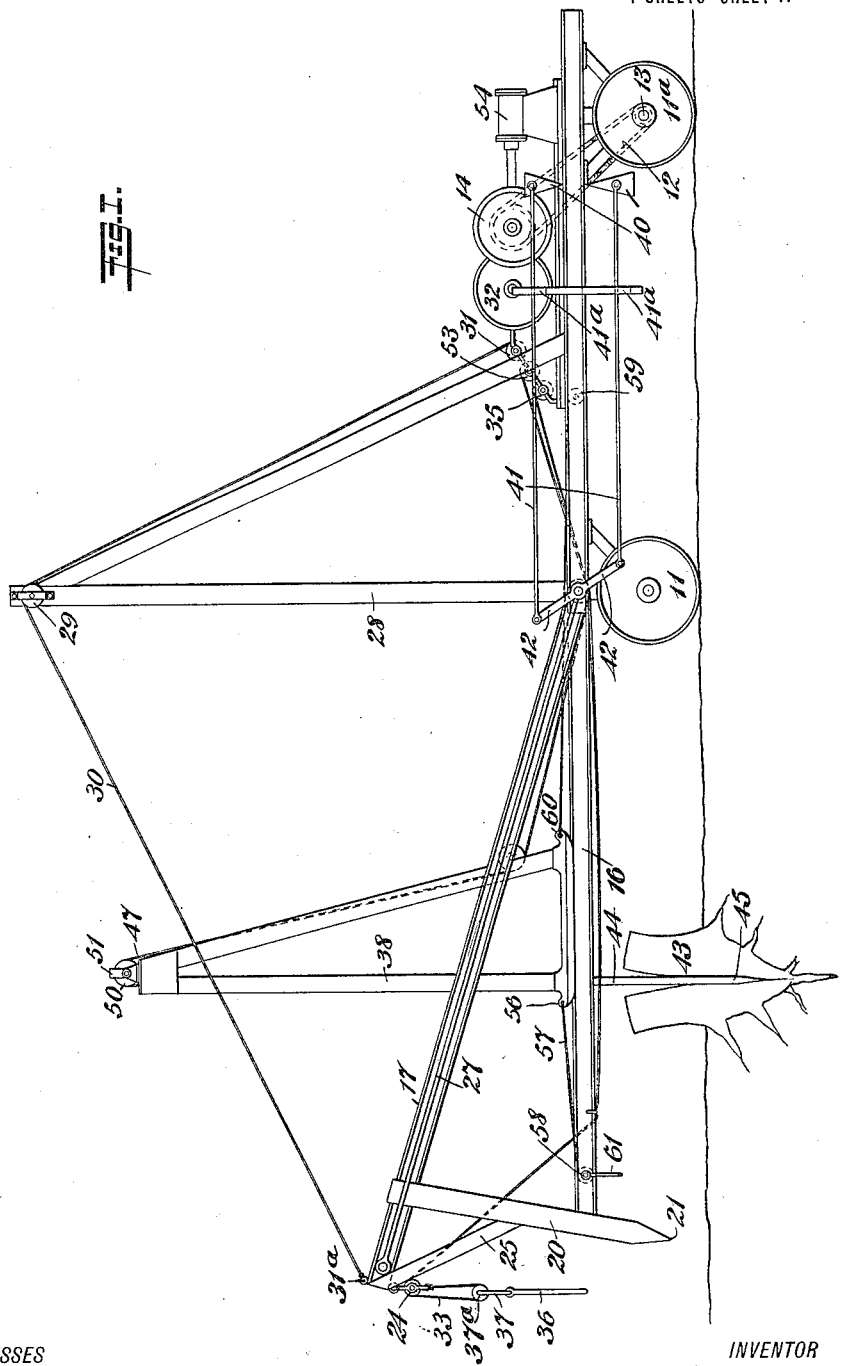

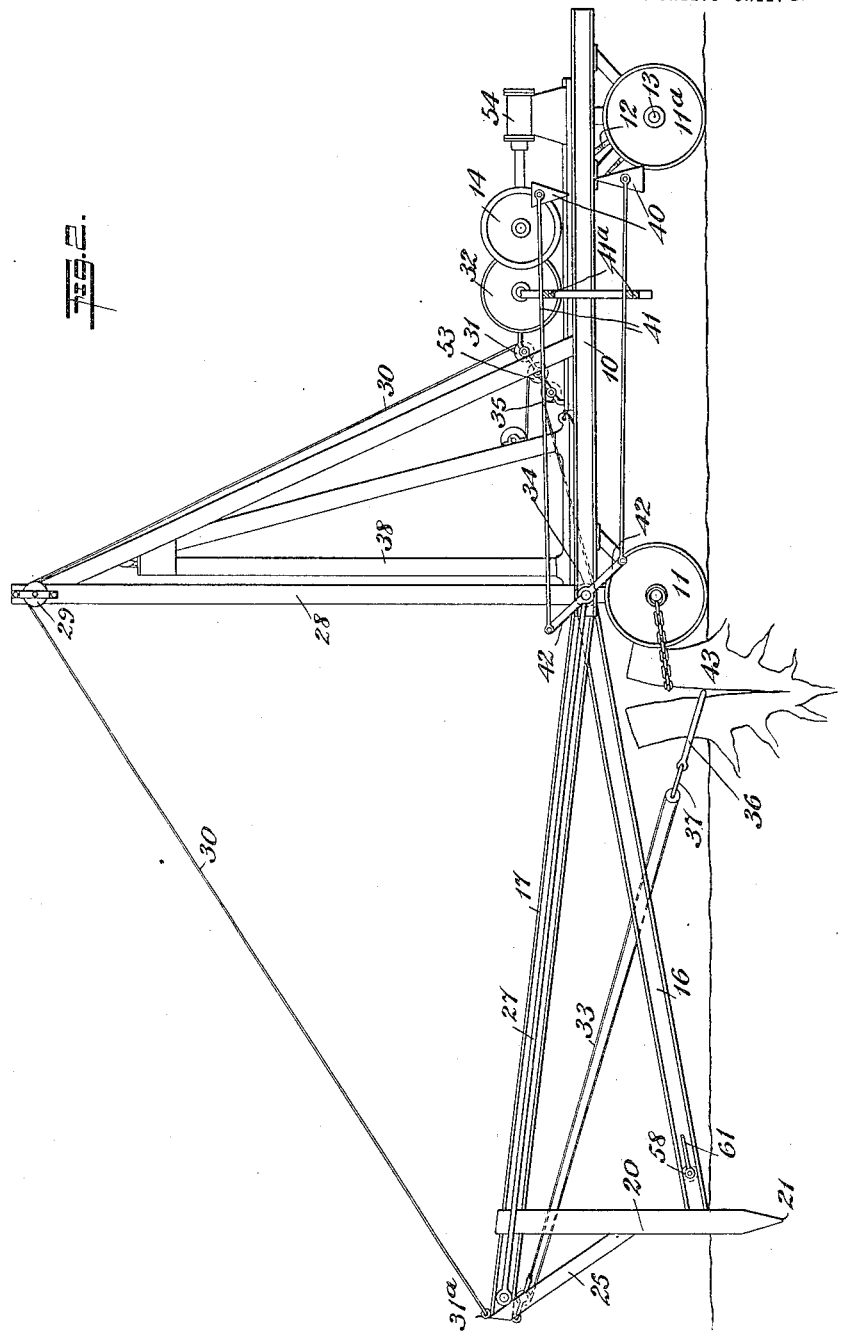

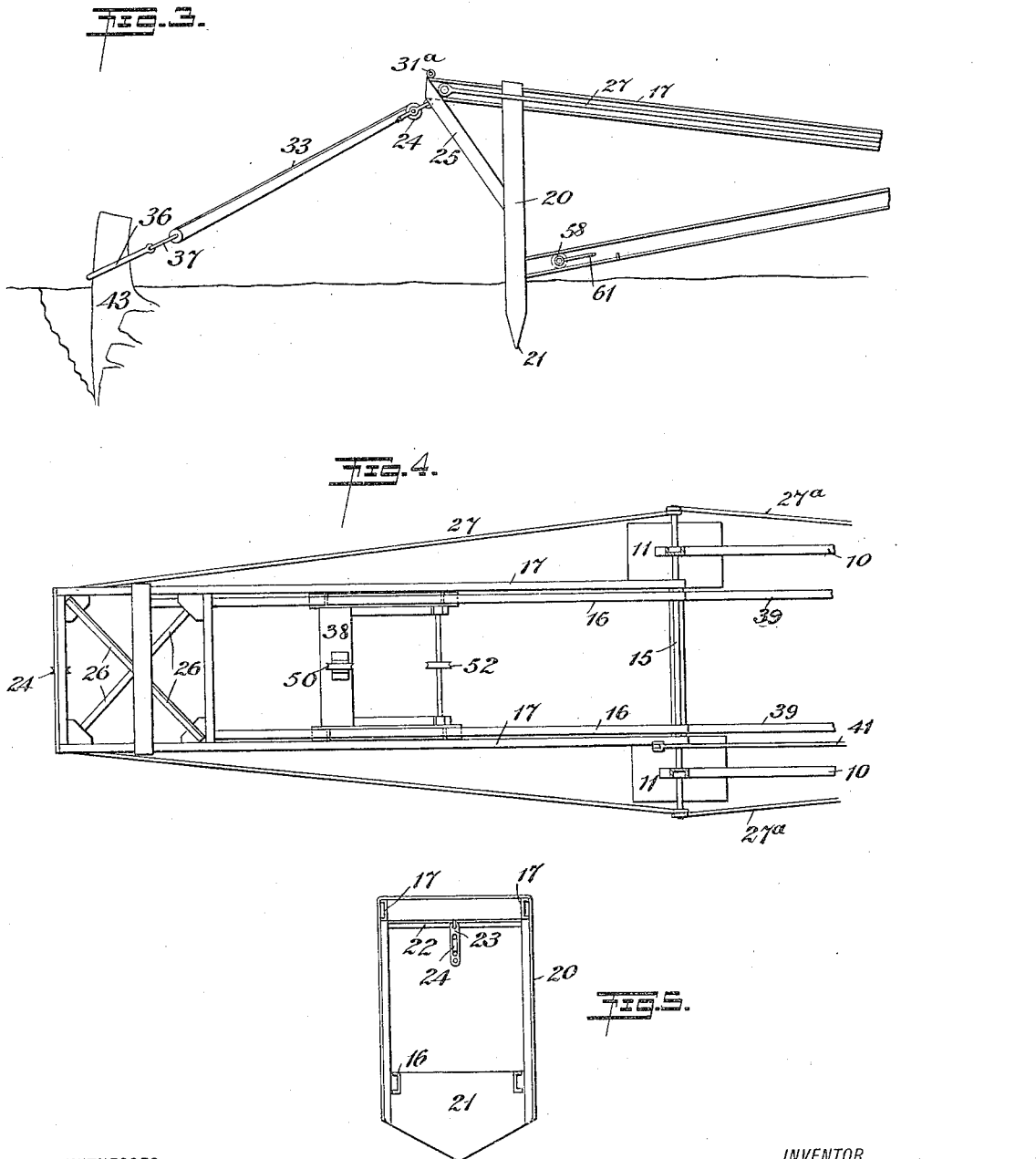

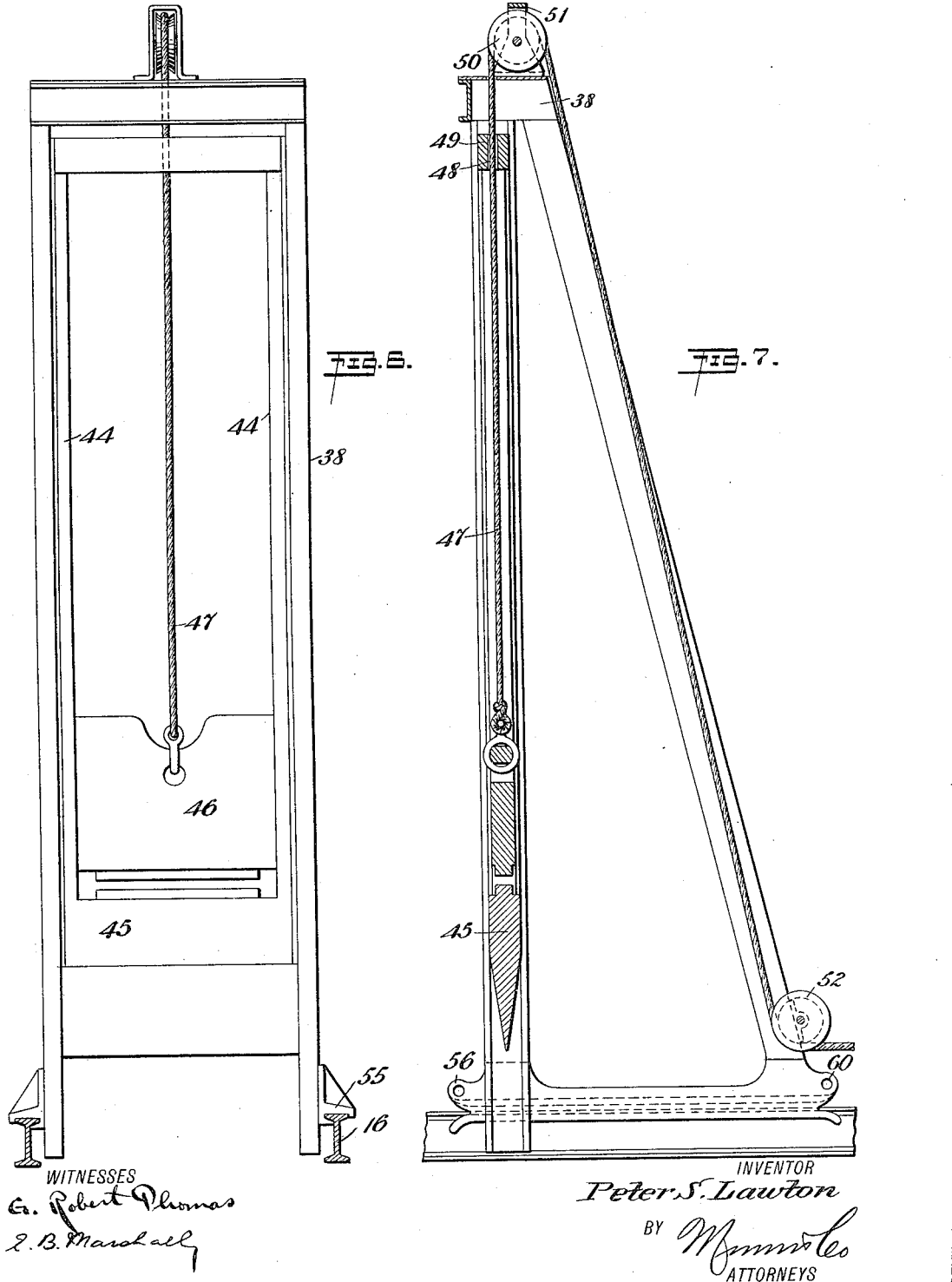

PETER S. LAWTON, OF NEW ORLEANS, LOUISIANA.

STUMP-PULLER.

1,143,209.　　　Specification of Letters Patent.　　Patented June 15, 1915.

Application filed April 2, 1914. Serial No. 829,026.

*To all whom it may concern:*

Be it known that I, PETER S. LAWTON, a citizen of the United States, and a resident of New Orleans, in the parish of Orleans and State of Louisiana, have invented a new and Improved Stump-Puller, of which the following is a full, clear, and exact description.

My invetnion has for its object to provide a stump puller with a main frame to which is pivoted a boom and track, a guide frame being provided for moving from the main frame to the track and in which a cutter frame is adapted to travel to cut vertically the stump disposed under the guide frame. After the stump has been severed a number connected with the boom and the main frame by a tackle is secured to part of the cut stump and the remainder of the stump is secured to the main frame to pull the first mentioned part of the stump out of the ground. The member on the tackle is then secured to the remainder of the stump to pull it from the ground.

Another object of my invention is to provide the cutter frame with guides in which travels a weight or hammer for acting against the cutter at the bottom of the cutter frame. When the stump has been severed the weight is raised and comes in contact with the underside of a cross head of the cutter frame and with the upward movement of the weight or hammer the cutter frame is moved in the guide frame.

Still other objects of the invention will appear in the following specification in which the preferred form of my invention is disclosed.

In the drawings similar reference characters refer to similar parts in all the views in which—

Figure 1 is a side elevation of my invention showing the cutter in operation; Fig. 2 is a view similar to that shown in Fig. 1, but with the guide frame carrying a cutter disposed on the main frame and with the tackle secured to a portion of the severed stump to pull it from the ground; Fig. 3 is a fragmentary view showing how the remainder of the stump is pulled from the ground; Fig. 4 is a plan view of the boom as shown in Fig. 1 of the drawings; Fig. 5 is a front view of the boom showing an anchor which may be disposed in the ground; Fig. 6 is a front view of the guide frame, the cutter frame and the weight or hammer; and Fig. 7 is a side section elevation of Fig. 6.

Hitherto stumps have been pulled from the ground without previously splitting them into sections, which has made the work difficult and has required that considerable power be used to obtain the results desired. With my stump puller the stump may be quickly split into two parts and each of these parts may be quickly pulled from the ground for each part will have no roots extending in one direction and the roots extending in the other direction may be quickly torn through the soil.

By referring to the drawings it will be seen that the main frame 10 is mounted on wheels 11 and 11$^a$ and that the rear wheels 11$^a$ are adapted to be driven by a sprocket chain 12 which is disposed around a sprocket wheel on the axle 13 on which the wheels 11$^a$ are mounted. This sprocket chain 12 is also disposed around a sprocket wheel which may be connected by a clutch on the drum 14. In this manner the main frame 10 may be moved under its own power. At the front of the main frame 10 there is journaled to the bar 15 the rails 16, the members 17 of the boom being secured at the outer sides of the rails 16 and being also journaled to this bar 15. The bar 15 is secured to the main frame. Secured to the members 17 of the boom and depending therefrom there is an anchor frame 20 having an anchor blade 21 adapted to pierce and obtain a firm hold for the boom. The rails 16 are also secured to this anchor frame 20 as best shown in Figs. 1 and 5 of the drawings. The ends of the members 17 of the boom are connected by a transverse member 22 to which is secured a pulley 23 having a sheave 24, and extending downwardly and rearwardly from the forward ends of the members 17 there are braces 25 which are secured to the anchor frame 20 as shown in Fig. 2 of the drawings. In addition the ends of the members 17 of the boom are connected by horizontal obliquely disposed braces 26. The bar 15 extends beyond the sides of the main frame 10 and to the terminals of this bar 15 there are secured the braces 27 which extend forward and are secured to the sides of the members 17 of the boom. Rear braces 27ª extend from the ends of the bar 15 to the rear of the main frame 10. The forward end of the main frame 10 has a vertically disposed A frame 28 to which is journaled a sheave 29 over which is disposed a cable 30 which extends upwardly and rearwardly from the point 31ª at the forward end of the boom. This cable 30 then extends down under the pulley 31 from which it may be led to one of the drums 14 or 32. A tackle 33 is secured to the pulley 23 and a part of this tackle 33 is disposed around the sheave 24 from which it extends under the sheave 34 over the pulley 35 and to one of the drums 14 or 32. A ring or hooks 36 are connected with this tackle 33 by the coupling member 37 and the sheave 37ª. The sheave 34 is journaled to the bar 15.

The guide frame 38 which is disposed on rails 39 on the main frame 10 may be rolled on to the rails 16 when the said rails 16 are in alinement with the rails 39. This may be determined by any suitable means such as an upright rod fastened to the boom which when the rails 16 are in alinement with the rails 39 will be disposed at a mark on the frame 38.

As a means for determining under all conditions when the track is at a right angle with a line drawn through the center line of the cutter frame 38 to the ground arms 42 are mounted on the bar 15 and are secured to a boom member 17. Articulated to these arms there are rods 41 which are supported on guides 41ª and to which there are swiveled plummets 40. The positions of these plummets 40 relatively to each other indicate the angularity of the cutter frame relatively to the ground.

In the guide frame 38 there is disposed for moving, a cutter frame 44, this cutter frame 44 having a cutter 45 on its lower end. The cutter frame 44 has guide-ways in which a weight or hammer 46 is adapted to move, a cable 47 being secured to the weight or hammer, this cable 47 being disposed through an opening 48 in a transverse head member 49 and being disposed over a sheave 50 journaled in a bracket 51 secured to the top of the guide frame 38. This cable 47 is then disposed under a sheave 52 journaled in a bearing in the bottom of the rear guide frame 38, the cable 47 then being led around the pulley 53 and to one of the drums 14 or 32.

When the guide frame 38 has been moved into position above the stump 43, the cable 47 is pulled to raise the weight 46, the weight then being permitted to fall against the cutter 45 at the bottom of the cutter frame 44 to drive the cutter 45 down into the stump 43. When the stump 43 has been cut in two, the cable 47 is pulled sufficiently high to move the weight or hammer 46 into engagement with the head member 49 of the cutter frame 44 to raise the cutter frame and the cutter out of engagement with the stump 43. The cable 47 is pulled periodically as may be desired to accomplish this result by means of one of the drums 32 or 14 which may be operated by the engine 54. When the stump 43 has been severed vertically, the ring or hooks 36 are secured to one of the pieces of the stump 43, after which the main frame 10 is moved forwardly on its wheels 11 and 11ª until the wheels 11 and 11ª are disposed at the stump. The axle on which the vehicle wheels 11 are mounted, or any other suitable portion of the main frame 10 is then secured to the adjacent severed portion of the stump 43. This having been done, the cable 33 is pulled by the engine 54 and the drums 32 or 14 to pull the forward portion of the stump out of the ground. This having been accomplished the main frame 10 is moved rearwardly and with the ring or hooks 36 secured to the remaining portion of the stump 43, as is shown in Fig. 3 of the drawings and this remaining portion of the stump 43 is then pulled from the ground.

It will be understood that as the stump 43 is severed vertically that either portion of the stump has its roots extending only in one general direction, this making it possible to pull the said roots through the earth, thereby permitting the ready removal of the stump. If desired the stumps may be pulled horizontally in the manner which has been described until they are practically free from the earth and then the boom may be raised by means of the cable 30 so that the remainder of the roots may be pulled upwardly, clear of the ground.

As shown in Figs. 6 and 7 of the drawings, the guide frame 38 has runners 55 for moving on the rails 16 and 39, the forward portion of the guide frame 38 having orifices 56 in which is disposed a cable 57, this cable being disposed around a shaft 58 and then rearwardly and around the shaft 59 on the main frame 10, the cable 57 then extending forwardly and being secured to the rear of the guide frame 38 at 60. To the shaft 58 there is secured a crank 61 which may be conveniently rotated to move the guide frame 38 forward or rearward as may be desired. Any suitable means may be provided for locking the shaft 58 relatively to the rails 16 for preventing any further movement of the guide frame 38 until desired.

It will be seen that when the forward portion of the severed stump is being pulled from the ground, the machine will be anchored by the anchor 21, the locking of the driving gear 12 and by securing the forward axle to the rear portion of the stump. It will also be seen that when the remaining portion of the stump is being pulled from the ground the machine may be anchored by the anchor 21 and by locking the driving mechanism.

Having thus described my invention I claim as new and desire to secure by Letters Patent:

1. In a stump puller, a main frame, a track carried thereby and extending longitudinally of the main frame, a guide frame movably mounted on the track, a cutter for reciprocating vertically in the guide frame for severing the stump, and means operable at the main frame for pulling the severed parts of the stump.

2. In a stump puller, an open cutter frame having a cutter at its bottom, and a top member spaced therefrom, and a hammer movably disposed in the cutter frame for striking the bottom of the cutter frame and for lifting the cutter frame by engagement with the said top member.

3. In a stump puller, a main frame having a vertically extending portion, a boom pivoted to the main frame, an anchor on the boom for engaging the ground, a tackle on the boom for pulling a stump and extending to the main frame, a cable secured to the boom disposed over a member of the vertically extending portion and extending to the body of the main frame.

4. In a stump puller, a main frame, a boom pivoted to the main frame, a rail pivoted to the main frame coaxially with the boom, an anchor depending from the boom and secured to the rail, a frame having a cutter for moving from the main frame on the rail, a tackle on the boom, and means for raising the boom and rails.

5. In a stump puller, a main frame, rails pivoted to the main frame, a tackle, means connecting the tackle with the rails to be moved therewith, and a cutting device for moving from the main frame on to the rails.

6. In a stump puller, a main frame, rails pivoted to the main frame, a tackle, means connecting the tackle with the rails to be moved therewith, a cutting device for moving from the main frame on to the rails, and an anchor secured to the rails and depending therefrom for engaging the ground.

7. In a stump puller, a main frame, rails pivoted to the main frame, a guide frame for moving from the main frame to the rails, a cutter frame having a cutter for moving in the guide frame, a hammer for moving in the cutter frame and adapted to engage the bottom of a horizontal member of the cutter frame, means for raising the cutter frame, a tackle, and means connecting the tackle with the rails to be moved therewith.

8. In a stump puller, a guide frame, a cutter frame having a cutter for moving in the guide frame, a hammer for moving in the cutter frame and adapted to engage the bottom of a horizontal member of the cutter frame and means for raising the hammer.

9. In a stump puller, a guide frame, a cutter frame having a cutter at its bottom and a head with an opening at its top, a hammer for moving in the cutter frame and adapted to engage the bottom of a horizontal member of the cutter frame, and a cable secured to the hammer and extending through the opening in the head of the cutter frame.

10. In a stump puller, a main frame, rails pivoted to the main frame, a cutting device for moving from the main frame to the rails, arms secured for moving with the rails, rods articulated to the arms and extending rearwardly for indicating the position of the rails relatively to the main frame and guides for the rails.

11. In a stump puller, a vertical guide frame, a cutter frame movably disposed in the guide frame and having a vertical guideway, a cutter at the bottom of the cutter frame, means to limit the downward movement relatively to the cutter frame, and a weight for moving in the guideway in the cutter frame for engaging the cutter.

12. In a stump puller, a vertical guide frame, an open vertical cutter frame movably disposed in the guide frame and having a vertical guideway, a cutter at the bottom of the cutter frame, means to limit the downward movement of the cutter relatively to the cutter frame, and a weight movably disposed in the guideway in the cutter frame for the purpose specified.

13. In a stump puller, an open cutter frame having a cutter at its bottom and a top spaced therefrom, a guide frame in which the cutter frame is movably mounted, and a hammer movably disposed in the cutter frame for striking the bottom of the cutter frame and for lifting the cutter frame relatively to the guide frame by engagement with the top of the cutter frame.

In testimony whereof I have signed my name to this specification in the presence of two subscribing witnesses.

PETER S. LAWTON.

Witnesses:
F. J. DOLLINGER,
A. J. RHODES.

Copies of this patent may be obtained for five cents each, by addressing the "Commissioner of Patents, Washington, D. C."